US011467673B2

(12) United States Patent
Sandhan

(10) Patent No.: US 11,467,673 B2
(45) Date of Patent: Oct. 11, 2022

(54) METHOD FOR CONTROLLING CAMERA AND ELECTRONIC DEVICE THEREFOR

(71) Applicant: Samsung Electronics Co., Ltd., Gyeonggi-do (KR)

(72) Inventor: Tushar Balasaheb Sandhan, Gyeonggi-do (KR)

(73) Assignee: Samsung Electronics Co., Ltd

( * ) Notice: Subject to any disclaimer, the term of this patent is extended or adjusted under 35 U.S.C. 154(b) by 85 days.

(21) Appl. No.: 17/076,186

(22) Filed: Oct. 21, 2020

(65) Prior Publication Data
US 2021/0124424 A1    Apr. 29, 2021

(30) Foreign Application Priority Data
Oct. 24, 2019  (KR) .................. 10-2019-0132738

(51) Int. Cl.
| G06F 3/048 | (2013.01) |
| G06F 3/01 | (2006.01) |
| H04N 5/232 | (2006.01) |
| H01Q 3/26 | (2006.01) |
| H01Q 1/24 | (2006.01) |
| H04B 7/06 | (2006.01) |

(52) U.S. Cl.
CPC ............. *G06F 3/017* (2013.01); *H01Q 1/243* (2013.01); *H01Q 3/2605* (2013.01); *H04B 7/0617* (2013.01); *H04N 5/23203* (2013.01)

(58) Field of Classification Search
CPC ....... G06F 3/017; H01Q 1/243; H01Q 3/2605
See application file for complete search history.

(56) References Cited

U.S. PATENT DOCUMENTS

| 7,173,604 | B2 | 2/2007 | Marvit et al. |
| 7,176,886 | B2 | 2/2007 | Marvit et al. |
| 8,793,620 | B2 | 7/2014 | Stafford |
| 8,851,372 | B2 | 10/2014 | Zhou et al. |
| 8,968,103 | B2 | 3/2015 | Zhou et al. |
| 9,153,074 | B2 | 10/2015 | Zhou et al. |
| 9,335,825 | B2 | 5/2016 | Rautiainen et al. |
| 9,499,067 | B2 | 11/2016 | Dai |
| 9,533,546 | B2 | 1/2017 | Cheng |
| 9,625,720 | B2 | 4/2017 | Nohara |
| 9,715,740 | B2 | 7/2017 | Jin et al. |

(Continued)

FOREIGN PATENT DOCUMENTS

EP    01728142    8/2010

OTHER PUBLICATIONS

International Search Report dated Feb. 9, 2021 issued in counterpart application No. PCT/KR2020/014389, 4 pages.

*Primary Examiner* — Claudia Dragoescu
(74) *Attorney, Agent, or Firm* — The Ferrell Law Firm, P.C.

(57) ABSTRACT

A method for controlling a camera of an electronic device is provided. The method includes generating a plurality of beams using an antenna array including a plurality of antenna elements and detecting an external object using the plurality of beams, sensing a movement of the external object using a first beam corresponding to the external object among the plurality of beams, identifying a gesture corresponding to the movement based on the movement of the external object, and controlling a first camera of the electronic device based on the gesture.

12 Claims, 14 Drawing Sheets

(56) References Cited

U.S. PATENT DOCUMENTS

| | | |
|---|---|---|
| 9,723,222 B2 | 8/2017 | Oh et al. |
| 9,855,817 B2 | 1/2018 | Hsiao et al. |
| 9,921,657 B2 | 3/2018 | Sprenger et al. |
| 10,057,483 B2 | 9/2018 | Her et al. |
| 10,186,045 B2 | 1/2019 | Jin et al. |
| 10,369,466 B2 | 8/2019 | Zalewski et al. |
| 10,376,785 B2 | 8/2019 | Hernandez-Abrago et al. |
| 10,691,219 B2 | 6/2020 | Holz |
| 2005/0212753 A1 | 9/2005 | Marvit et al. |
| 2006/0282873 A1 | 12/2006 | Zalewski et al. |
| 2007/0015559 A1 | 1/2007 | Zalewski et al. |
| 2011/0057831 A1* | 3/2011 | Shinomiya ............ G01S 13/003 342/189 |
| 2011/0083111 A1* | 4/2011 | Forutanpour ......... H04W 4/023 715/863 |
| 2011/0181509 A1 | 7/2011 | Rautiainen et al. |
| 2011/0181510 A1* | 7/2011 | Hakala .................... G06F 3/017 345/158 |
| 2012/0272179 A1 | 10/2012 | Stafford |
| 2013/0182902 A1 | 7/2013 | Holz |
| 2013/0187834 A1 | 7/2013 | Nohara |
| 2013/0346168 A1 | 12/2013 | Zhou et al. |
| 2014/0191954 A1 | 7/2014 | Marvit et al. |
| 2015/0024728 A1 | 1/2015 | Jang |
| 2015/0229837 A1* | 8/2015 | Her .................... H04N 5/23219 348/222.1 |
| 2015/0277569 A1 | 10/2015 | Sprenger et al. |
| 2016/0021311 A1* | 1/2016 | Waltermann ........... H04N 5/247 348/262 |
| 2016/0119552 A1 | 4/2016 | Oh et al. |
| 2016/0274669 A1 | 9/2016 | Hsiao et al. |
| 2016/0276854 A1 | 9/2016 | Lian |
| 2016/0320853 A1 | 11/2016 | Lien et al. |
| 2017/0097684 A1* | 4/2017 | Lien ....................... G06V 40/28 |
| 2017/0184858 A1 | 6/2017 | Nohara |
| 2017/0288431 A1 | 10/2017 | Lian |
| 2017/0300051 A1 | 10/2017 | Zhou et al. |
| 2017/0372486 A1 | 12/2017 | Jin et al. |
| 2018/0056743 A1 | 3/2018 | Zhou et al. |
| 2019/0012564 A1 | 1/2019 | Holz et al. |
| 2019/0080188 A1 | 3/2019 | Zhou et al. |
| 2019/0108676 A1 | 4/2019 | Holz |
| 2019/0155396 A1 | 5/2019 | Lien et al. |
| 2019/0354662 A1 | 11/2019 | Min et al. |
| 2020/0005530 A1 | 1/2020 | Holz |
| 2020/0089314 A1 | 3/2020 | Poupyrev et al. |

\* cited by examiner

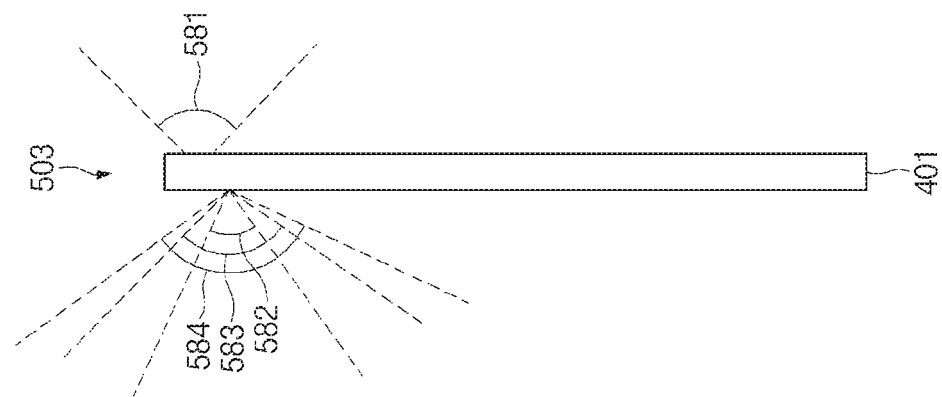
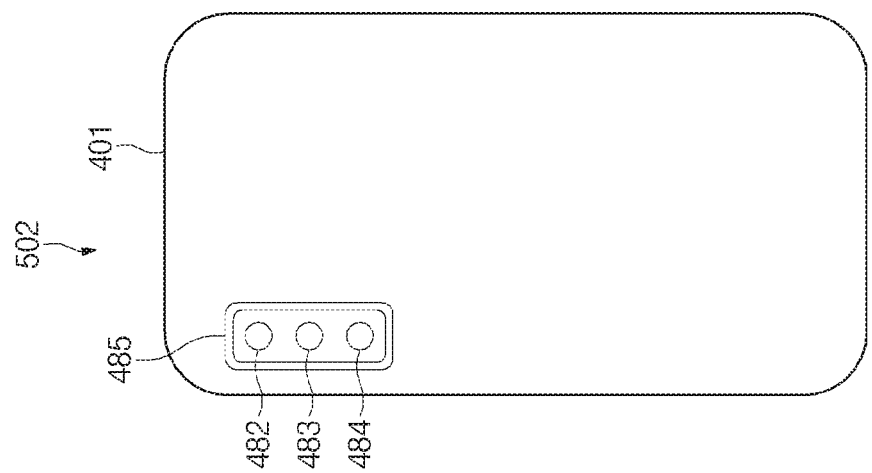
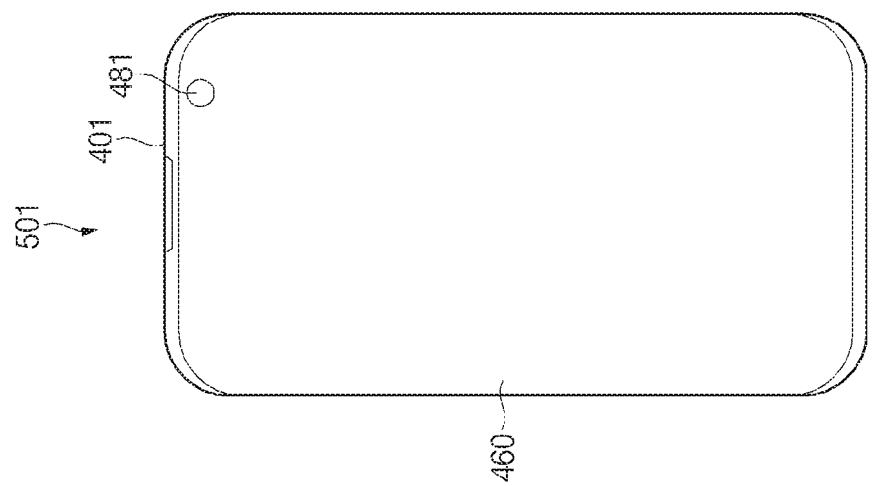
FIG.5

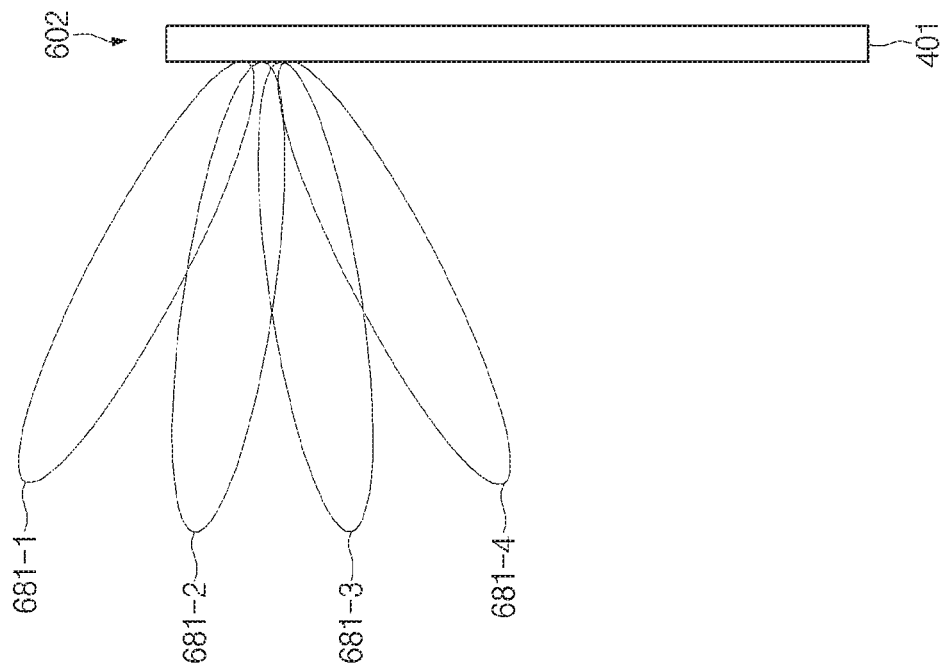
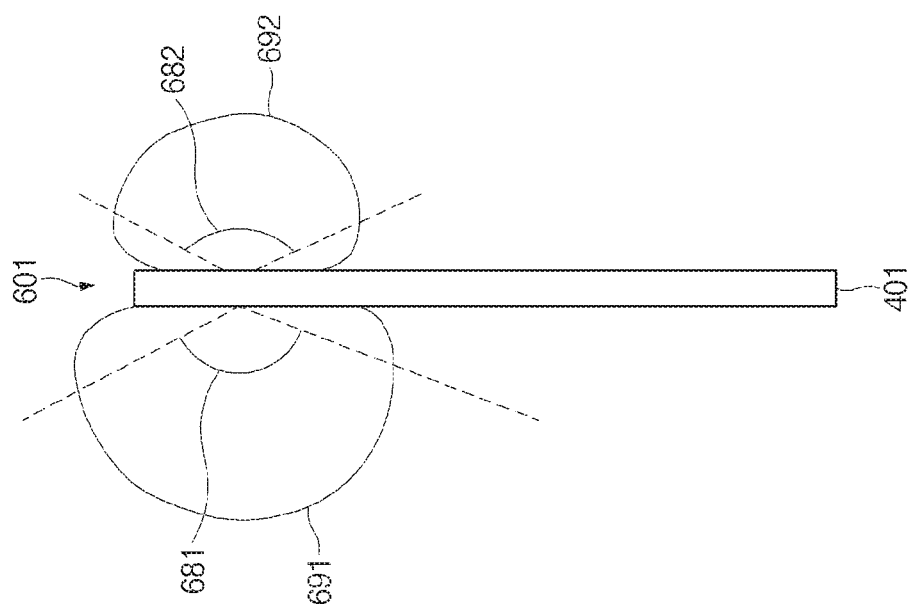
FIG. 6

METHOD FOR CONTROLLING CAMERA AND ELECTRONIC DEVICE THEREFOR

CROSS-REFERENCE TO RELATED APPLICATION(S)

This application claims the benefit under 35 U.S.C. § 119(a) of a Korean Patent Application filed on Oct. 24, 2019 in the Korean Intellectual Property Office and assigned Serial Number 10-2019-0132738, the entire disclosure of which is incorporated herein by reference.

BACKGROUND

1. Field

The present disclosure relates generally to a method for controlling a camera and an electronic device therefor.

2. Description of Related Art

Personalized electronic devices such as mobile phones are widely used. Mobile phones may provide various functions for user convenience to users. For example, mobile phones may include at least one camera for capturing an image. Users may use mobile phones to take pictures such as selfies. Taking a selfie may be restricted due to a physical limitation (e.g., the length of an arm) of a user. Thus, it may be difficult for a user to handle a mobile phone while holding the mobile phone with one hand. To resolve this problem, researches are carried out with regard to gesture recognition based on image analysis and command recognition based on voice analysis.

In the case of gesture recognition based on image analysis, a mobile phone may obtain an image of an external object using a camera, and may recognize a gesture by analyzing the image. For example, the mobile phone may recognize a specified gesture (e.g., smile) from an image corresponding to a face, and may capture an image based on the recognized gesture. For another example, the mobile phone may recognize a specified gesture (e.g., spreading a palm and closing a hand) from an image corresponding to a hand (e.g., palm), and may capture an image based on the recognized gesture. In this case, an object (e.g., a face or a finger) for recognizing a gesture is required to be positioned within an image. For example, when a user desires that the object not be included in a picture, an image cannot be captured based on image analysis. Furthermore, when a gesture is made using a face, the face of the user to be photographed may show an unnatural expression. Furthermore, such gesture recognition may be applied only to a particular camera (e.g., a front camera or rear camera of a mobile phone).

In the case of command recognition based on voice, the user may utter a specified speech to capture an image. In this case, the user may be required to utter a speech with at least specified loudness. For example, when the user is present in a particular place (e.g., a library), the user may not be allowed to make a loud sound.

Furthermore, the user may capture an image through a front camera or rear camera of a mobile phone. In this case, the user may be required to perform an additional input operation to select a camera. For example, when the user takes a selfie using a rear camera, it may be difficult for the user to determine whether the camera is oriented towards the user, and the user may be required to perform an additional task to confirm whether the rear camera is used.

SUMMARY

The present disclosure has been made to address at least the disadvantages described above and to provide at least the advantages described below.

In accordance with an aspect of the present disclosure, an electronic device is provided. The electronic device includes a display, a first camera, a wireless communication circuit connected to an antenna array including a plurality of antenna elements and configured to perform beamforming using the antenna array, a processor operatively connected to the display, the first camera, and the wireless communication circuit, and a memory operatively connected to the processor. The memory stores one or more instructions that, when executed, cause the processor to generate a plurality of beams using the antenna array and detecting an external object using the plurality of beams, sense a movement of the external object using a first beam corresponding to the external object among the plurality of beams, identify a gesture corresponding to the movement based on the movement of the external object, and control the first camera based on the gesture.

In accordance with an aspect of the present disclosure, a method for controlling a camera of an electronic device is provided. The method includes generating a plurality of beams using an antenna array including a plurality of antenna elements and detecting an external object using the plurality of beams, sensing a movement of the external object using a first beam corresponding to the external object among the plurality of beams, identifying a gesture corresponding to the movement based on the movement of the external object, and controlling a first camera of the electronic device based on the gesture.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 5 illustrates a camera configuration of an electronic device, according to an embodiment;

FIG. 6 illustrates beamforming using a communication circuit of an electronic device, according to an embodiment;

DETAILED DESCRIPTION

Hereinafter, various embodiments of the present disclosure will be described with reference to the accompanying drawings. It should be understood that the embodiments and the terms used herein are not intended to limit the technology described in the present disclosure to specific embodiments, but rather include various modifications, equivalents and/or alternatives of the embodiments.

Figure 1:
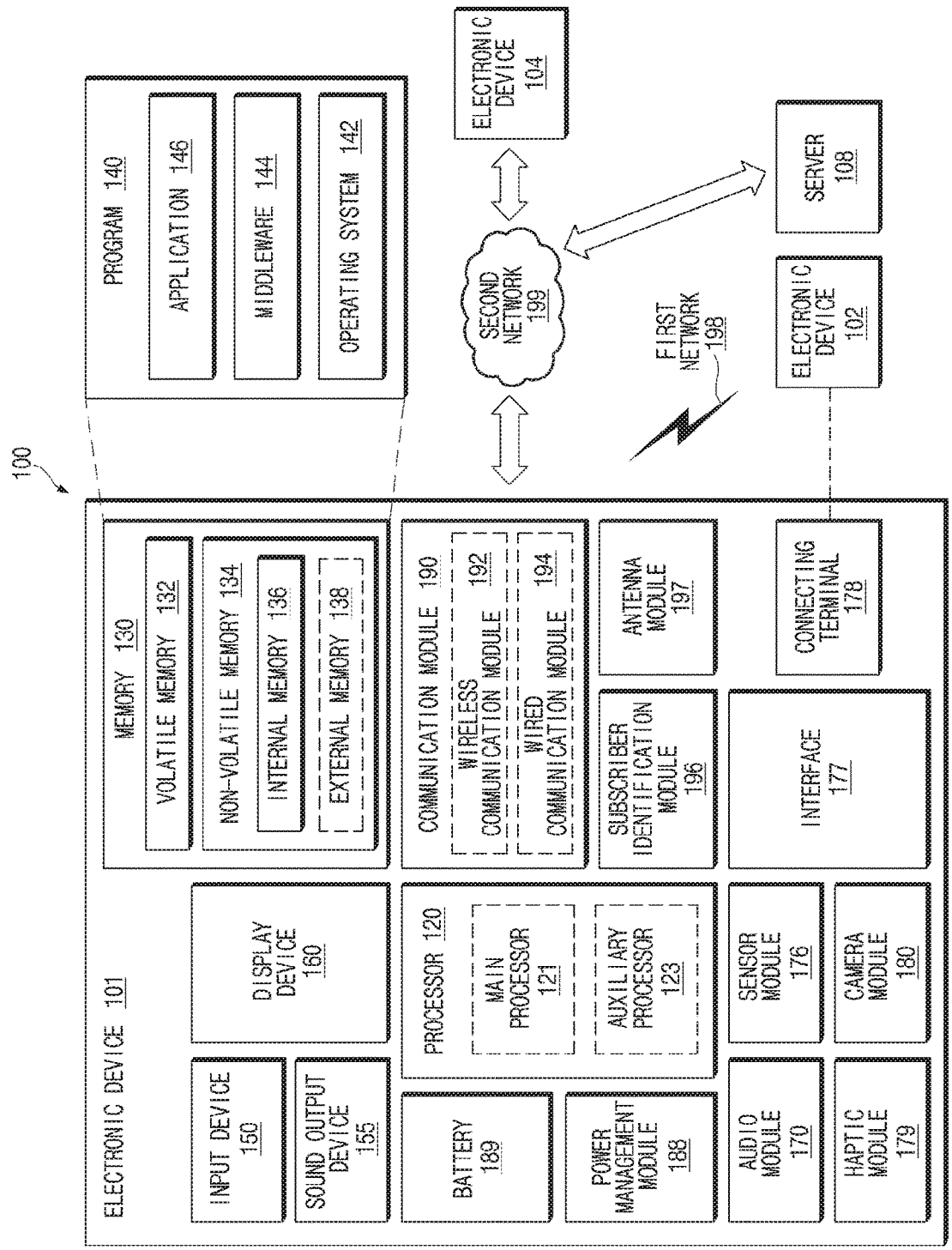
FIG. 1 is a block diagram illustrating an electronic device in a network, according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIP)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
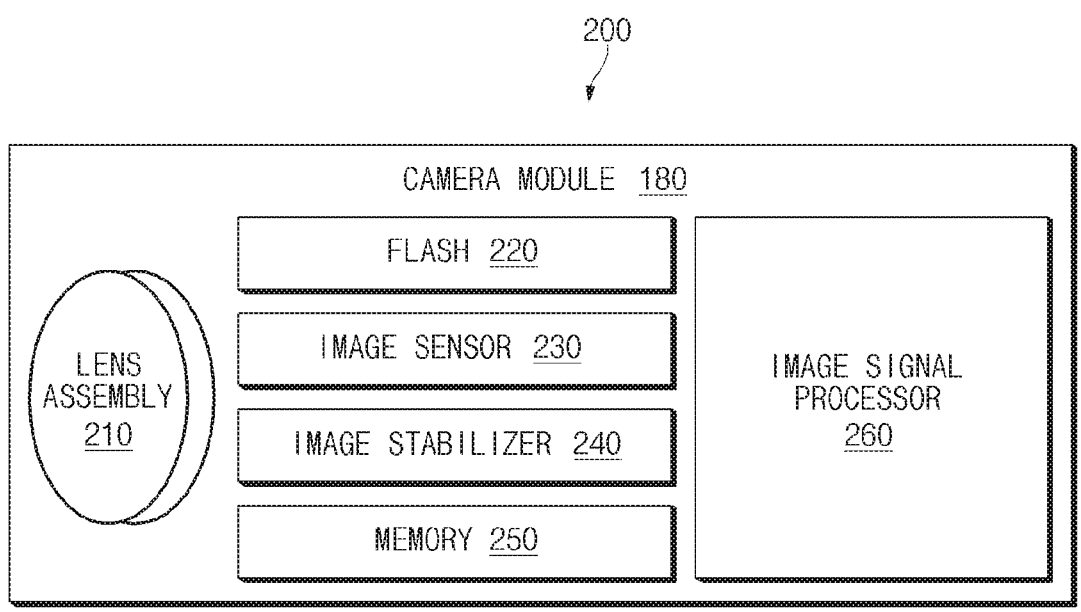
FIG. 2 is a block diagram illustrating a camera module, according to an embodiment.

FIG. 2 is a block diagram 200 illustrating the camera module 180, according to an embodiment. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. The camera module 180 may include a plurality of lens assemblies 210. In such a case, the camera module 180 may form a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include a wide-angle lens or a telephoto lens.

The flash 220 may emit light that is used to reinforce light reflected from an object. The flash 220 may include one or more light emitting diodes (LEDs) (e.g., a red-green-blue (RGB) LED, a white LED, an IR LED, or an ultraviolet (UV) LED) or a xenon lamp. The image sensor 230 may obtain an image corresponding to an object by converting light emitted or reflected from the object and transmitted via the lens assembly 210 into an electrical signal. The image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. The image stabilizer 240 may sense such a movement by the camera module 180 or the electronic device 101 using a gyro sensor (not shown) or an acceleration sensor (not shown) disposed inside or outside the camera module 180. The image stabilizer 240 may be implemented as an optical image stabilizer.

The memory 250 may store, at least temporarily, at least part of an image obtained via the image sensor 230 for a subsequent image processing task. If image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed by the image signal processor 260. The memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. The image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

The electronic device 101 may include a plurality of camera modules 180 having different attributes or functions. In such a case, at least one of the plurality of camera modules 180 may form a wide-angle camera and at least another of the plurality of camera modules 180 may form a telephoto camera. Similarly, at least one of the plurality of camera modules 180 may form a front camera and at least another of the plurality of camera modules 180 may form a rear camera.

Figure 3:
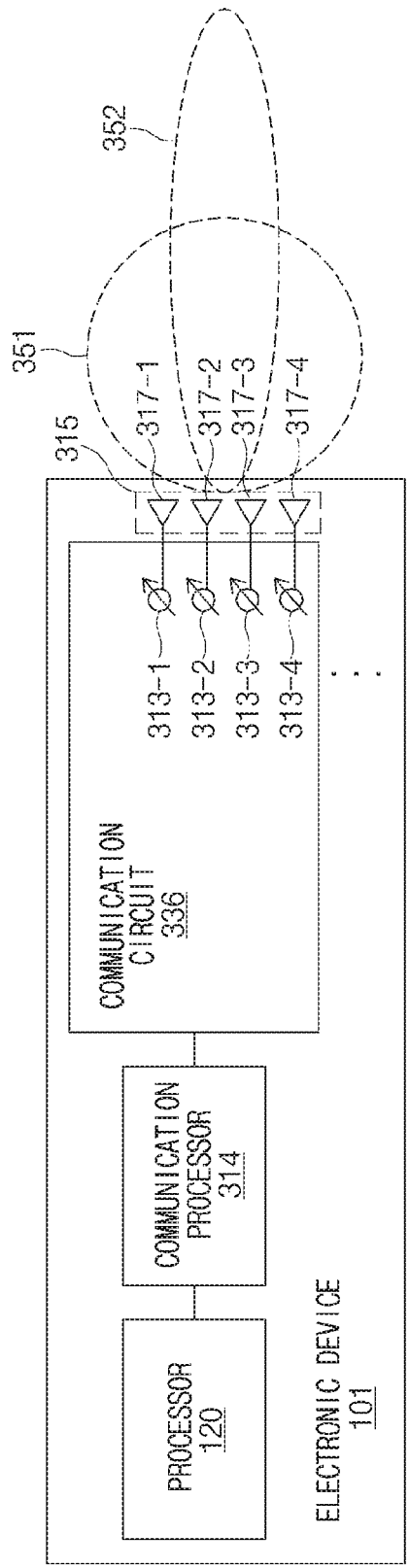
FIG. 3 is a block diagram illustrating a communication circuit of an electronic device, according to an embodiment.

FIG. 3 is a block diagram illustrating a communication circuit 336 of an electronic device 101, according to an embodiment.

The electronic device 101 may further include various components not shown in FIG. 3, but, for concise description, FIG. 3 illustrates the electronic device 101 as including a processor 120, a communication processor 314, and the communication circuit 336. The communication processor 314 and the communication circuit 336 may be configured as a single module.

The communication circuit 336 may include first to fourth phase converters 313-1 to 313-4 and/or first to fourth antenna elements 317-1 to 317-4. The first to fourth antenna elements 317-1 to 317-4 may be respectively connected to the first to fourth phase converters 313-1 to 313-4. The first to fourth antenna elements 317-1 to 317-4 may form at least one antenna array 315.

The communication processor 314 may control phases of signals transmitted and/or received through the first to fourth antenna elements 317-1 to 317-4 by controlling the first to fourth phase converters 313-1 to 313-4, and may generate a transmission beam and/or reception beam in a direction selected according to the control. The communication processor 314 may transmit a signal using a transmission antenna array, and may receive a signal using a reception antenna array configured separately from the transmission antenna array.

The communication circuit 336 may generate a beam 351 having a wide radiation pattern (hereinafter referred to as a "wide beam") or a beam 352 having a narrow radiation pattern (hereinafter referred to as a "narrow beam") according to the number of antenna elements. The communication circuit 336 may form the narrow beam 352 using all of a plurality of antenna elements (e.g., three or more antenna elements) among the first to fourth antenna elements 317-1 to 317-4), and may form the wide beam 351 using one or two antenna elements. The wide beam 351 may have a wider coverage than that of the narrow beam 352, but may have a low antenna gain. On the contrary, the narrow beam 352 may have a narrower coverage than that of the wide beam 351, but may have a higher antenna gain.

Figure 4:
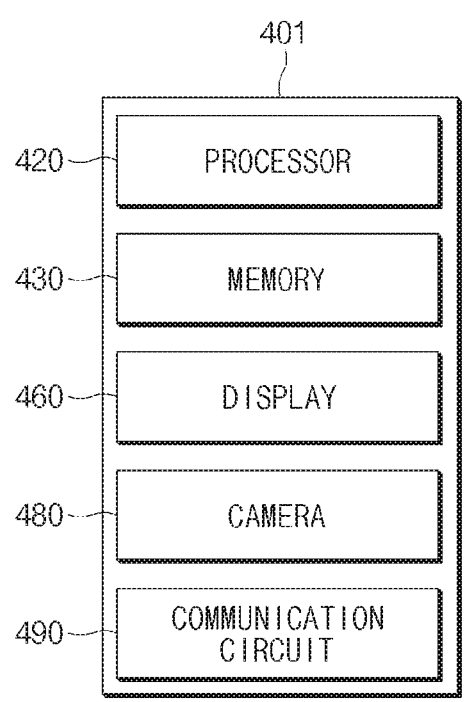
FIG. 4 is a block diagram illustrating an electronic device, according to an embodiment.

FIG. 4 is a block diagram illustrating an electronic, device according to an embodiment.

An electronic device 401 may include a processor 420, a memory 430, a display 460, a camera 480, and a communication circuit 490. The configuration of the electronic device 401 illustrated in FIG. 4 is exemplary, and embodiments of the present disclosure are not limited thereto. The electronic device 401 may not include at least one of the components illustrated in FIG. 4. The electronic device 401 may further include a component not illustrated in FIG. 4.

The processor 420 may be operatively connected to the memory 430, the display 460, the camera 480, and the communication circuit 490. The processor 420 may control the components (e.g., the memory 430, the memory 440, the display 460, the camera 480, and the communication circuit 490) of the electronic device 401. The processor 420 may control the components of the electronic device 401 according to one or more instructions stored in the memory 430.

The processor 420 may obtain an image using the camera 480. The camera 480 may include a plurality of lenses. The camera may obtain an image using at least portion of the plurality of lenses. The camera 480 may be configured to obtain RGB data using visible light. The camera 480 may be configured to obtain an image using infrared light.

The processor 420 may communicate with an external device using the communication circuit 490. The communication circuit 490 may be configured to perform beamforming using an antenna array including a plurality of antenna elements. The communication circuit 490 may be configured to transmit/receive mmWave band signals. The communication circuit 490 may transmit/receive signals according to Institute of Electrical and Electronics Engineers (IEEE) 802.ay standards. The communication circuit 490 may transmit/receive at least 6-GHz signals of a new radio (NR) communication protocol of 3rd Generation Partnership Project (3GPP).

The electronic device 401 may include the display 460, a first camera (e.g., the camera 480), a wireless communication circuit (e.g., the communication circuit 490) connected to an antenna array including a plurality of antenna elements and configured to perform beamforming using the antenna array, the processor 420 operatively connected to the display 460, the first camera, and the wireless communication circuit, and the memory 430 operatively connected to the processor. The memory 430 may store one or more instructions that, when executed, cause the processor 420 to perform the operations described below.

The processor 420 may generate a plurality of beams using the antenna array, detect an external object using the plurality of beams, sense a movement of the external object using a first beam corresponding to the external object among the plurality of beams, identify a gesture corresponding to the movement based on the movement of the external object, and control the first camera based on the gesture.

The electronic device 401 may further include a second camera (e.g., the camera 480). The processor 420 may generate a wide beam that is relatively wider than the plurality of beams using a part of the plurality of antenna elements, sense a location of the external object relative to the electronic device using the wide beam, and select the first camera among the first camera and the second camera based on the location of the external object relative to the electronic device. The first camera and the second camera may be oriented in different directions.

The processor 420 may display, on the display 460, an image captured using the selected first camera, and may display, on the display 460, an indicator indicating the location of the external object detected using the plurality of beams.

The indicator may indicate relative location information about the location of the external object relative to the captured image. The external object sensed using the wide beam may be positioned outside an FOV of the first camera. The captured image may not include the external object.

The processor 420 may determine whether the external object is positioned in front of or in the rear of the electronic device by sensing a phase change of the external object using the wide beam, and may select the first camera according to the determined direction of the external object.

The processor 420 may sequentially generate a plurality of beams using the antenna array, and may detect the external object by transmitting a signal and sensing a reflected signal using the plurality of beams sequentially.

The processor 420 may sense a pattern of the phase change due to the movement of the external object using the first beam, and may identify a gesture corresponding to the movement of the external object at least partially based on the pattern of the phase change.

The processor 420 may select a gesture corresponding to the identified gesture from among a plurality of gestures stored in the memory, and may control the first camera to perform a camera function corresponding to the selected gesture.

FIG. 5 illustrates a camera configuration of an electronic device, according to an embodiment.

The camera 480 may include a first camera 481, a second camera 482, a third camera 483, and a fourth camera 484. The configuration of the camera 480 illustrated in FIG. 4 is exemplary, and embodiments of the present disclosure are not limited thereto. The camera of the electronic device 401 may further include an infrared camera.

In 501, the first camera 481 may be positioned on a front surface (e.g., a surface on which the display 460 is positioned) of the electronic device 401, and may be referred to as a front camera. The first camera 481 may be mounted in a form of a punch-hole in the display 460. The first camera 481 may be positioned under the display 460, and may be configured to obtain an image through the display 460. The first camera 481 may be positioned in a region of the front surface of the electronic device 401 outside the display 460.

In 502, the second camera 482, the third camera 483, and the fourth camera 484 may be positioned on a rear surface (e.g., the reverse side of the surface on which the display 460 is positioned) of the electronic device 401. The second camera 482, the third camera 483, and/or the fourth camera 484 may be referred to as a rear camera 485.

In 503, the first camera 481, the second camera 482, the third camera 483, and the fourth camera 484 may have different FOVs. The first camera 481 may capture an image of an object in front of the electronic device 401 at a first FOV 581. The second camera 482, the third camera 483, and the fourth camera 484 may capture an image of an object in a rear of the electronic device 401. The second camera 482 may have a second FOV 582. The third camera 483 may have a third FOV 583. The fourth camera 484 may have a fourth FOV 584.

FIG. 6 illustrates beamforming using a communication circuit of an electronic device, according to an embodiment.

In 601, the electronic device 401 may generate a wide beam using the communication circuit 490, and may transmit/receive a signal using the wide beam. A first lobe 691 may be a main lobe, and a second lobe 692 may be a back lobe. When the electronic device 401 forms a wide beam, the first lobe 691 and the second lobe 692 may have a coverage of a relatively wide angle. The first lobe 691 may have a coverage of a first angle 681, and the second lobe 692 may have a coverage of a second angle 682.

The processor 420 may detect an external object using the communication circuit 490. Detection of the external object may include identification or sensing of the location of the external object, the direction of the external object, the distance to the external object, the type of the external object, movement of the external object, and/or a pattern of the external object. The processor 420 may detect an external object by transmitting a signal using the communication circuit 490 and receiving or sensing a reflected signal that is the transmitted signal reflected from the external object. The processor 420 may determine a distance between the electronic device 401 and the external object based on a time difference between the transmitted signal and the reflected signal and/or a phase difference between the transmitted signal and the reflected signal. The processor 420 may detect the external object using a wide beam. Since the wide beam has a wide coverage, the external object positioned within a wide angle range may be detected. Since the wide beam has a relatively low directivity, the electronic device 401 may determine the distance to the external object, but it may be difficult to determine the direction of the external object.

In 602, the electronic device 401 may generate a narrow beam using the communication circuit 490, and may transmit/receive a signal using the narrow beam. The electronic device 401 may form beams oriented in various directions by changing a phase and/or size associated with a plurality of antenna elements of an antenna array. The communication circuit 490 may form a first beam 681-1, a second beam 681-2, a third beam 681-3, and a fourth beam 681-4. The number and shape of the beams illustrated in FIG. 4 are exemplary, and embodiments of the present disclosure are not limited thereto. When the electronic device 401 forms a narrow beam, each of the beams 681-1 to 681-4 may have a coverage of a relatively narrow angle.

The processor 420 may detect the direction of the external object relative to the electronic device 401 using the communication circuit 490. The processor 420 may detect a moving object by forming wide beams 691 and 692 using the communication circuit 490 and sensing the moving object. The processor 420 may detect the moving object based on a Doppler effect. When a movement of an external object is detected in front of the electronic device 401 (e.g., when a movement of an external object is detected by the second lobe 692), the electronic device 401 may determine that the external object is positioned in front of the electronic device 401. When a movement of an external object is detected in the rear of the electronic device 401 (e.g., when a movement of an external object is detected by the first lobe 691), the electronic device 401 may determine that the external object is positioned in the rear of the electronic device 401.

The processor 420 may obtain data associated with the external object using the communication circuit 490. The data associated with the external object may include the distance to the external object, the shape of the external object, and/or the movement of the external object. The processor 420 may determine the distance to the external object based on the transmitted signal and the reflected signal. The processor 420 may obtain information about the shape of the external object by forming a beam in a region in which the external object is positioned and obtaining distance and direction information through a plurality of beams (e.g., a narrow beam). The processor 420 may transmit a signal to the region of the external object using the first beam 681-1 and may receive a reflected signal using the first beam 681-1 to obtain first data. The processor 420 may transmit a signal to the region of the external object using the second beam 681-2 and may receive a reflected signal using the second beam 681-2 to obtain second data. The processor 420 may transmit a signal to the region of the external object using the third beam 681-3 and may receive a reflected signal using the third beam 681-3 to obtain third data. The processor 420 may generate the information about the shape of the external object using the first data, the second data, and the third data. The processor 420 may obtain movement information about the external object based on the phase difference between a transmitted signal and a received signal. The processor 420 may obtain the movement information about the external object by sensing a phase shift due to a Doppler effect.

The processor 420 may detect an external object using the communication circuit 490. The processor 420 may detect an external object by forming a narrow beam using the communication circuit 490, transmitting a signal using the formed beam, and receiving or sensing a reflected signal that is the transmitted signal reflected from the external object. Since the narrow beam has a relatively high directivity compared to a wide beam, the processor 420 may determine the distance to the external object and the direction of the external object (e.g., a direction relative to the electronic device 401). Furthermore, the processor 420 may sense a movement in a specific region using a narrow beam. The processor 420 may recognize a gesture of the external object based on a Doppler effect.

Figure 7:
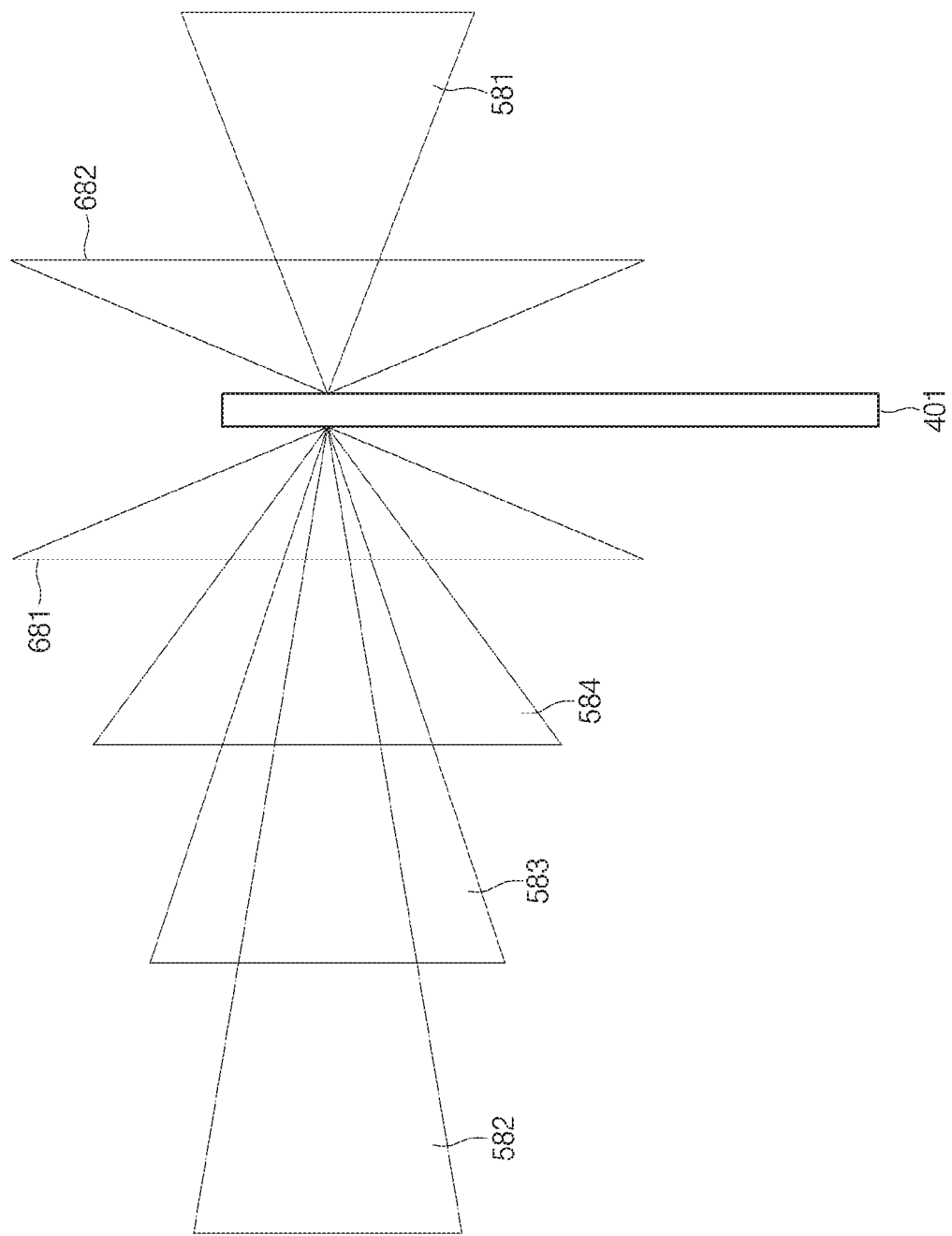
FIG. 7 illustrates various fields of view (FOVs) of an electronic device, according to an embodiment.

FIG. 7 illustrates various FOVs of the electronic device 401, according to an embodiment.

FIG. 7 illustrates exemplary FOV that may be generated by a camera and a communication circuit of the electronic device 401. The FOVs of the communication circuit 490 may correspond to the first angle 681 and the second angle 682 corresponding to the first beam 691 and the second beam 692 of FIG. 6. The FOVs of the camera 480 may include the first FOV 581 of the first camera, the second FOV 582 of the second camera, the third FOV 583 of the third camera, and the fourth FOV 584 of the fourth camera.

In the example of FIG. 7, the FOVs 681 and 682 that may be generated using a wide beam of the communication circuit 490 may be wider than an FOV that may be generated by the camera 480. The first camera may capture an image within the first FOV 581, the second camera may capture an image within the second FOV 582, the third camera may capture an image within the third FOV 583, and the fourth camera may capture an image within the fourth FOV 584. The communication circuit 490 may detect an external object (e.g., distance to an object and/or movement of an object) within the first FOV 681 and/or the second FOV 682.

In the example of FIG. 7, since the FOVs corresponding to the communication circuit 490 is relatively wider than the FOVs of the camera 480, the electronic device 401 may sense or detect an external object which is not sensed or detected by the camera 480. When the external object is positioned in front of the electronic device 401, the electronic device 401 may detect the external object using the communication circuit 490 even if the external object is not positioned within the first FOV 581. When the external object is positioned in the rear of the electronic device 401, the electronic device 401 may detect the external object using the communication circuit 490 even if the external object is not positioned within the fourth FOV 584.

Figure 8:
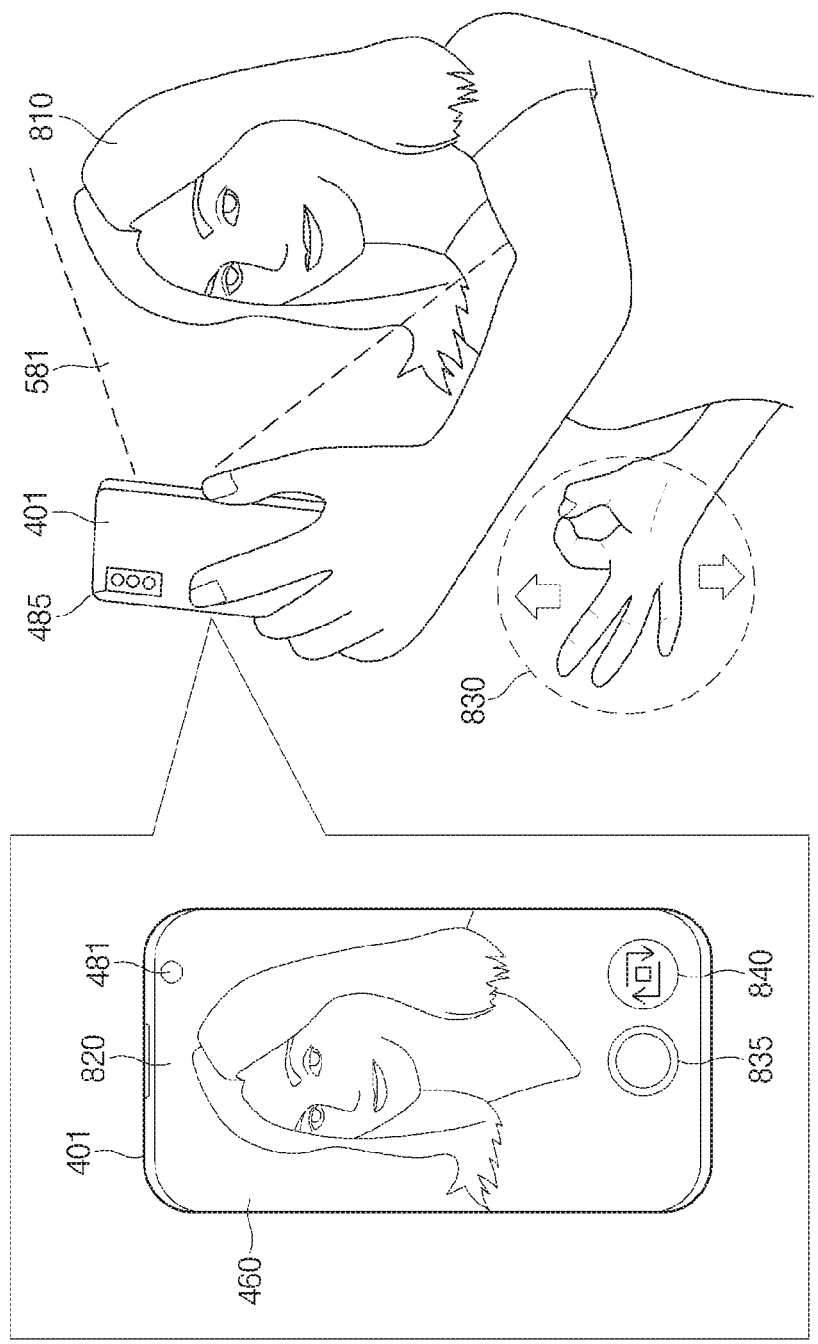
FIG. 8 illustrates an image capturing method of an electronic device, according to an embodiment.

FIG. 8 illustrates an image capturing method of an electronic device, according to an embodiment.

In the example of FIG. 8, a user 810 may take a selfie using the first camera 481 positioned on the front surface of the electronic device 401. When a default camera of the electronic device 401 is set as the rear camera 485, the user 810 may be required to change a camera setting of the electronic device 401. The user 810 may touch a camera switching object 840 provided on a camera user interface 820 in order to change the camera setting of the electronic device 401. However, when the user 810 has already posed for taking a selfie, it may be difficult for the user 810 to touch the camera switching object 840. When the user 810 attempts to take a selfie using the rear camera 485, the user 810 may be unable to recognize that the electronic device 401 is using the front camera 481.

The electronic device 401 may select one of a plurality of cameras of the electronic device 401 by detecting an external object (e.g., the user 810). The electronic device 401 may detect an external object using the communication circuit 490 when the camera 480 of the electronic device 401 is enabled. The electronic device 401 may use the communication circuit 490 to sense the movement of the external object using a wide beam (e.g., a beam formed using one or two antenna elements among the plurality of antenna elements of the communication circuit 490). In the example of FIG. 8, the electronic device 401 may detect that the movement of the external object occurs in front of the electronic device 410 based on a gesture 830 (e.g., shaking an OK sign up and down) of the user 810. The electronic device 810 may select the first camera 481 positioned on the front surface of the electronic device 401 based on the movement of the external object detected in front of the electronic device 401. In the example of FIG. 8, although the gesture 830 is performed outside the first FOV 581 of the first camera 481, the electronic device 401 may sense the gesture 830 using the communication circuit 490. Although FIG. 8 illustrates that the electronic device 401 senses the movement of the external object using a wide beam, embodiments of the present disclosure are not limited thereto. The electronic device 401 may sense the movement of the external object using a narrow beam. The electronic device 401 may use a first beam (e.g., a specified beam) in order to sense the movement of an object positioned in front of the electronic device 401. The electronic device 401 may use a second beam (e.g., a specified beam) in order to sense the movement of an object positioned in the rear of the electronic device 401.

In the example of FIG. 8, the user 810 may perform image capture (e.g., still image and/or video) using the first camera 481 after selecting the camera (e.g., selecting a camera by the electronic device 401 using the communication circuit 490). The user 810 may perform image capture through an input to an image capture object 835 of the camera user interface 820. However, it may be difficult for the user 810 to perform input (e.g., touch input) to the image capture object 835 after posing for a selfie. In this case, the user 810 may be required to change a selfie pose in order to perform input to the image capture object 835. The user 810 may move the electronic device 401 to perform input to the image capture object 835, and, thus, a blurred image may be captured by the electronic device 401. In addition, in the case of gesture recognition using a camera, a gesture may be restricted due to the FOV of the camera, and the camera may not correctly recognize a gesture in a specific image capture environment (e.g., low-illumination environment).

The electronic device 401 may identify the gesture 830 of the user 810. The electronic device 401 may form a wide beam using the communication circuit 490, and may identify the gesture 830 using the wide beam. The electronic device 401 may form a plurality of narrow beams using the communication circuit 490, and may select one narrow beam by performing beam sweeping using the plurality of narrow beams. The communication circuit 490 may select a narrow beam (e.g., a narrow beam directed to the location of the gesture 830) corresponding to the gesture 830 from among the plurality of narrow beams. The electronic device 401 may identify the gesture 830 using the narrow beam, and may control the first camera 481 to perform a function corresponding to the identified gesture 830. When a first gesture is identified, the electronic device 401 may perform a function (e.g., start to capture an image or shoot a video) which is the same as that performed upon reception of an input to an image capture button (e.g., the camera capture object 835) of a camera. When a second gesture is identified, the electronic device 401 may perform zoom-in or zoom-out for a camera. When a third gesture is identified, the electronic device 401 may change a selected camera. When a fourth gesture is identified, the electronic device 401 may change a camera effect. The above-mentioned camera functions are exemplary, and embodiments of the present disclosure are not limited thereto.

Hereinafter, a method for controlling the camera 480 using the communication circuit 40 of the electronic device 401 will be described with reference to FIGS. 9 to 12. The examples described below may be equally applied to the embodiment of FIG. 8.

Figure 9:
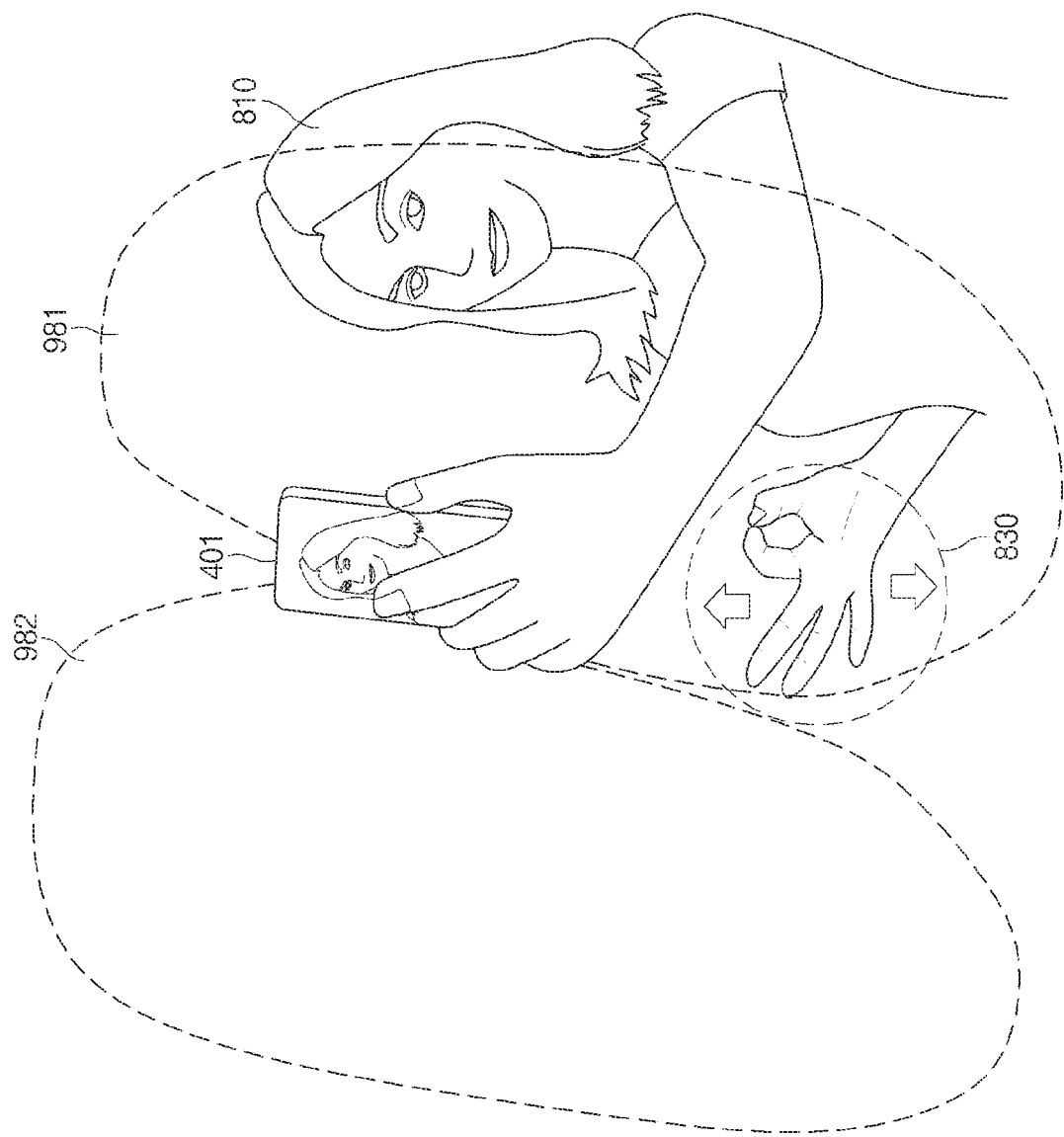
FIG. 9 illustrates an object detection method of an electronic device, according to an embodiment.

FIG. 9 illustrates an object detection method of the electronic device 401, according to an embodiment.

In the example of FIG. 9, the electronic device 401 may detect an external object (e.g., the user 810) using a communication circuit. The electronic device 401 may generate a first beam 981 and a second beam 982 using the communication circuit 490, and may sense a movement (e.g., the gesture 830) of an external object using the first beam 981.

When using wide beams such as the first beam 981 and the second beam 982, the electronic device 401 may sense the direction (e.g., direction in front of or in the rear of the electronic device 401) of the external object, the distance to the external object, and/or the movement of the external object. The electronic device 401 may sense the movement of the external object based on a Doppler effect. The electronic device 401 may transmit a signal using a wide beam, and may sense a reflected signal that is the transmitted signal reflected from the external object. The electronic device 401 may sense the movement of the external object by detecting a frequency variation of the reflected signal.

The electronic device 401 may select at least one camera based on the movement of the external object. The electronic device 401 may correspond to a camera corresponding to the direction in which a meaningful movement of the external object is sensed. In the example of FIG. 9, the electronic device 401 may select a camera (e.g., the rear camera 485) positioned on the rear surface of the electronic device 401 based on the movement of the external object. The electronic device 401 may enable the rear camera 485 and disable the front camera 481. In the example of FIG. 8, the electronic device 401 may select a camera (e.g., the first camera 481) positioned on the front surface of the electronic device 401 based on the movement of the external object.

The electronic device 401 may select at least one camera based on the distance to the external object. The electronic device 401 may select one camera based on the distance to a sensed movement of the external object. When the external object is positioned in the rear of the electronic device 401, the electronic device 401 may select one of the second camera, the third camera, and the fourth camera based on the sensed movement (e.g., the gesture 830) of the external object. This is merely an example, and embodiments of the present disclosure are not limited thereto. The electronic device 401 may select a preset camera for a selected direction.

The electronic device 401 may select a front camera and/or a rear camera based on the movement of the external object. Movement of external objects may be sensed both in front of and in the rear of the electronic device 401. In this case, the electronic device 401 may select at least one of the front camera or the rear camera. The electronic device 401 may select at least one camera according to a setting of the electronic device 401. When a simultaneous image capture mode is set in the electronic device 401, the electronic device 401 may enable both of the front camera and the rear camera. The electronic device 401 may display, on the display 460, both an image obtained by the front camera and an image obtained by the rear camera. When the simultaneous image capture mode is not set in the electronic device 401, the electronic device 401 may select, from among the front camera and the rear camera, the camera oriented in the direction in which a response is strongest. The electronic device 401 may transmit signals using the communication circuit 490, and may select a camera corresponding to the direction (e.g., front or rear direction) in which a magnitude of a reflected signal of a transmitted signal is largest.

Figure 10:
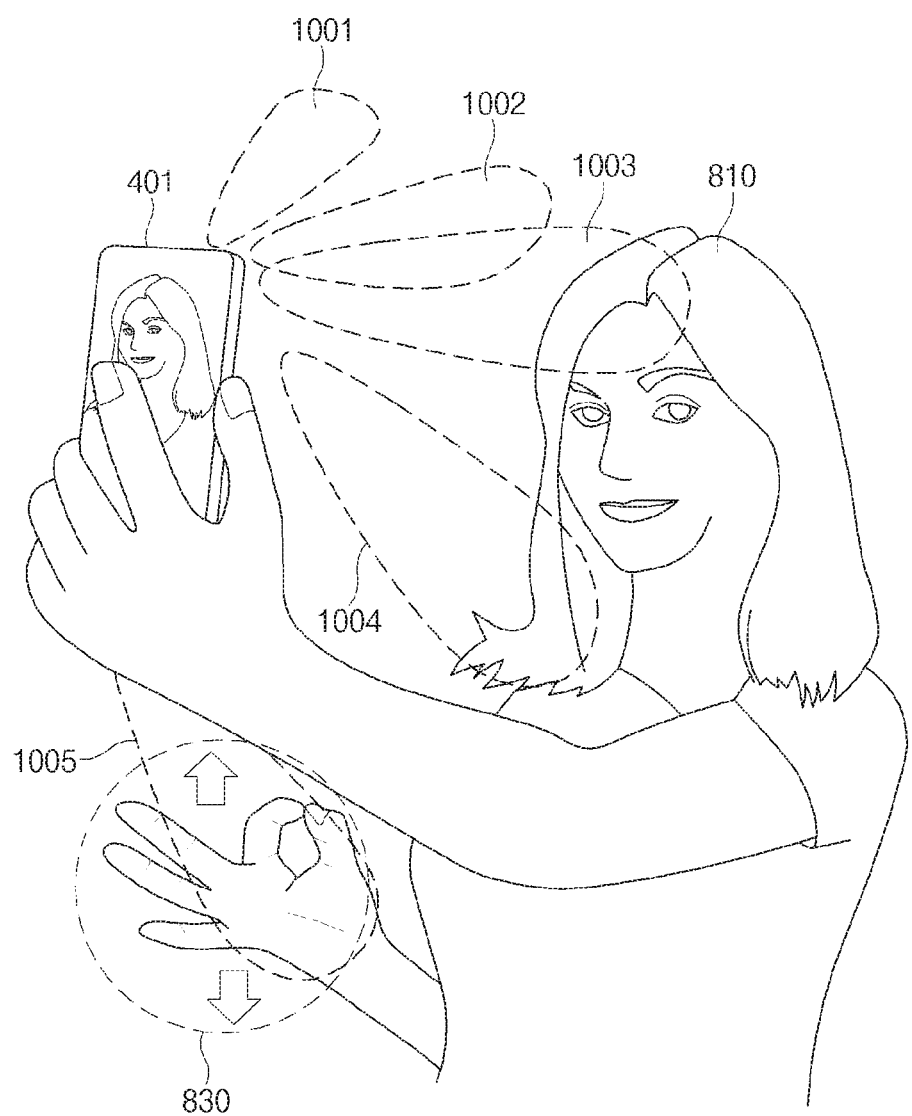
FIG. 10 illustrates a gesture recognition method using a communication circuit of an electronic device, according to an embodiment.

FIG. 10 illustrates a gesture recognition method using a communication circuit of the electronic device 401, according to an embodiment.

Referring to FIG. 10, after selecting a camera, the electronic device 401 may recognize a gesture using the communication circuit 490. The electronic device 401 may generate a plurality of narrow beams using the communication circuit 490. The electronic device 401 may generate the plurality of narrow beams by performing beamforming using a plurality of antenna elements (e.g., at least three antenna elements) of an antenna array connected to the communication circuit 490. The plurality of narrow beams may be generated so as to be oriented in different directions. The electronic device 401 may perform beam sweeping using the communication circuit 490. The electronic device 401 may perform beam sweeping by sequentially generating a plurality of narrow beams and by transmitting a signal and sensing a reflected signal for each of the narrow beams.

In the example of FIG. 10, the electronic device 401 may sequentially generate a first beam 1001, a second beam 1002, a third beam 1003, a fourth beam 1004, and a fifth beam 1005 as narrow beams. The example of FIG. 10 is merely illustrative, and embodiments of the present disclosure are not limited thereto. The directions of beams, the number of beams, and the beam sweeping order illustrated in FIG. 10 are merely exemplary. The electronic device 401 may transmit a signal and sense a reflected signal using the first beam 1001. Thereafter, with regard to the second beam 1002, the third beam 1003, the fourth beam 1004, and the fifth beam 1005, the electronic device 401 may sequentially perform the same operation as that for the first beam 1001. This sequential beam scanning may be referred to as beam sweeping. The electronic device 401 may sense the gesture 830 using the fifth beam 1005. While detecting an external object using the fifth beam 1005, the electronic device 401 may sense the gesture 830 by sensing a frequency change based on a Doppler effect.

The electronic device 401 may identify the location of the gesture 830 through beam sweeping. The electronic device 401 may select a narrow beam (e.g., the fifth beam 1005) corresponding to the location of the gesture 830 through beam sweeping. After selecting a beam, the electronic device 401 may identify a gesture using the selected beam. Although FIG. 10 illustrates that the fifth beam 1005 is selected, embodiments of the present disclosure are not limited thereto. The electronic device 401 may identify the gesture 830 using a plurality of beams (e.g., a plurality of beams including the fifth beam 1005) corresponding to a location in which the gesture is recognized. Hereinafter, a gesture identifying method will be described with reference to FIG. 11.

Figure 11:
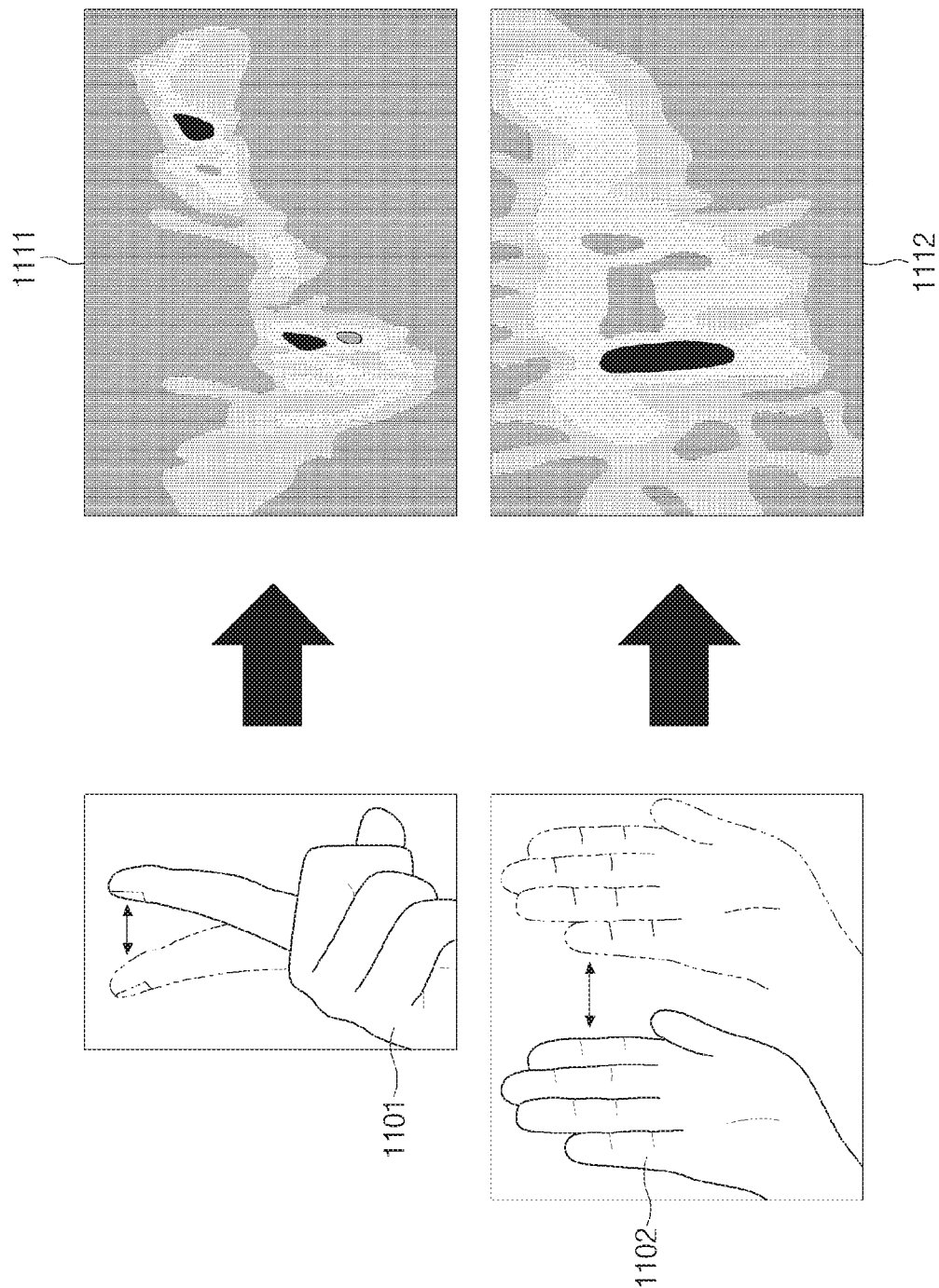
FIG. 11 illustrates various examples of gesture recognition, according to an embodiment.

FIG. 11 illustrates various examples of gesture recognition, according to an embodiment.

Referring to FIG. 11, a first gesture 1101 may be a gesture of wagging a finger. A first image 1111 may be an image pattern corresponding to the first gesture 1101 sensed through the communication circuit 490 in a frequency domain. A second gesture 1102 may be a gesture of moving a hand back and forth. A second image 1112 may be an image pattern corresponding to the second gesture 1102 sensed through the communication circuit 490 in a frequency domain.

As described above, since different frequency patterns appear according to a gesture, the electronic device 401 may identify a gesture (e.g., the shape and movement of an object which performs a gesture) using the communication circuit 490. The electronic device 401 may identify a gesture, and may perform a function corresponding to the gesture.

Figure 12:
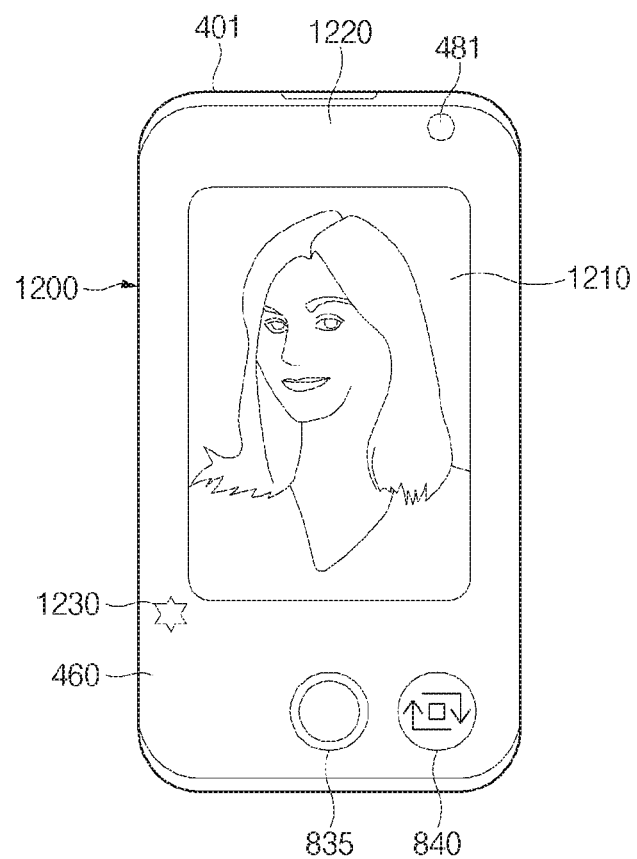
FIG. 12 illustrates a user interface, according to an embodiment.

FIG. 12 illustrates a user interface 1200, according to an embodiment.

The electronic device 401 may provide, to a user, information corresponding to the location of an identified gesture. Referring to FIG. 12, the electronic device 401 may provide, on the display 460, a user interface 1200 in response to execution of a camera application. The user interface 1200 may include an image (e.g., a preview image) captured by a camera (e.g., camera selected using the communication circuit 490). The user interface 1200 may include objects 835 and 840 for controlling a camera.

The electronic device 401 may use a narrow beam to sense a location in which a gesture is performed, and may display an indicator 1230 indicating information about the sensed location. In the example of FIG. 12, the electronic device 401 may display an image (e.g., a preview image) captured by a camera in a first region 1210 of the user interface 1200, and may display the indicator 1230 in a second region 1220. The electronic device 401 may display the indicator 1230 in the second region 1220 based on a location relative to an object (e.g., user) of the image displayed in the first region 1210 or a region (e.g., space) corresponding to the image. With regard to the object of the image captured by a camera, a region in which a gesture is recognized may be positioned under a bottom-left side of the object. In this case, the electronic device 401 may display the indicator 1230 at a bottom-left side of the first region 1210 or a bottom-left side of the second region 1220. The user may recognize, through the indicator 1230, the object (e.g., hand) corresponding to a gesture currently recognized by the electronic device 401.

The indicator 1230 illustrated in FIG. 12 is exemplary, and embodiments of the present disclosure are not limited thereto. The second region 1220 may be omitted, and the preview of the image may be displayed in an entire region. The indicator 1230 may be displayed within the first region 1210. In this case, the electronic device 401 may indicate the location of the gesture through the relative location of the indicator 1230 in a display region. A shape of the indicator 1230 is not limited to the illustrated shape. The first device 401 may provide various effects (e.g., glow, size change, shape change, flickering, and/or color change) to the indicator 1230. The electronic device 401 may provide different indicators according to the type of a recognized gesture.

The electronic device 401 may indicate the location of a gesture using an indicator (e.g., an indicator having a shape capable of indicating a direction) having directional information. In this case, the indicator may be displayed on a specific portion of the display 460.

The electronic device 401 may not display the indicator 1230 if a gesture is not recognized. If a gesture is no longer recognized after the gesture is recognized, the electronic device 401 may not display the indicator 1230 on the display 460 after providing a certain effect (e.g., flickering) to the indicator 1230.

Figure 13:
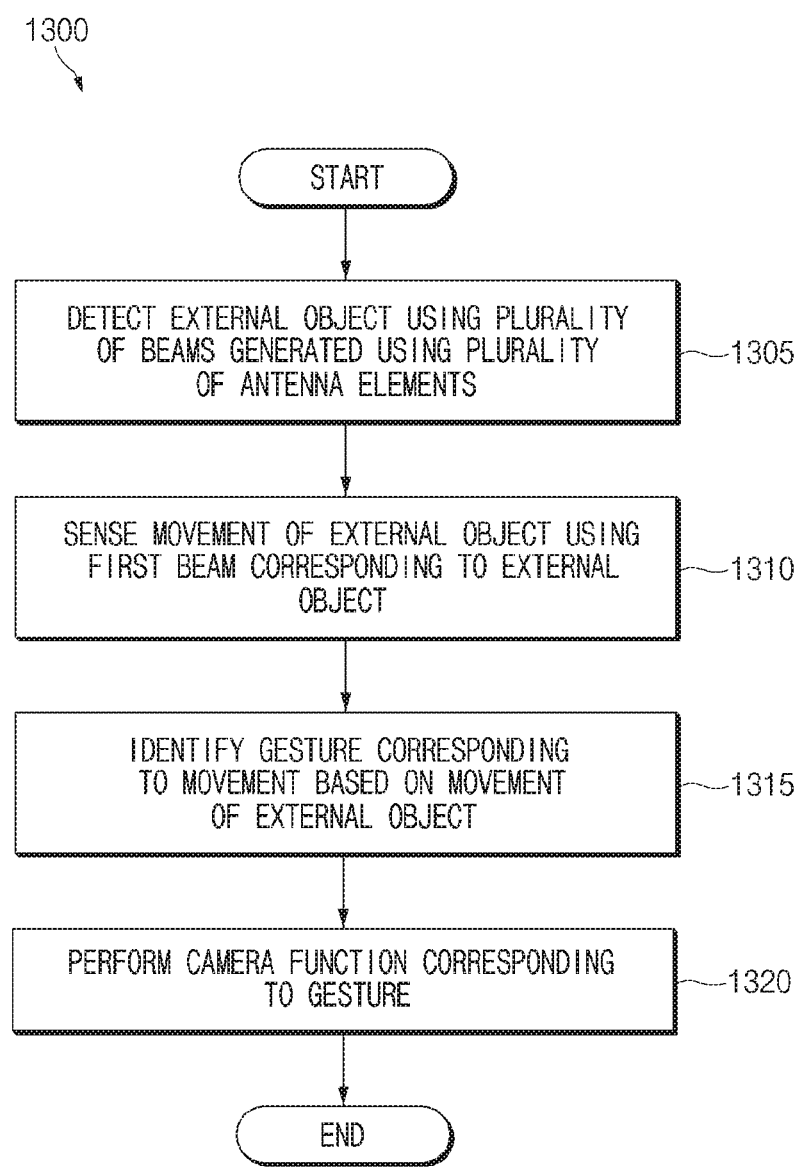
FIG. 13 is a flowchart of a camera control method, according to an embodiment.

FIG. 13 is a flowchart 1300 of a camera control method, according to an embodiment.

An electronic device may include a, a camera, a wireless communication circuit, a processor, and a memory. The wireless communication circuit may be connected to an antenna array including a plurality of antenna elements, and may be configured to perform beamforming using the antenna array. The memory may store one or more instructions that, when executed, cause the processor to perform the operations described below.

In the example of FIG. 13, the processor 420 may control, according to the steps of FIG. 13, a camera selected based on detection of an external object. The processor 420 may select at least one camera according to the methods described above with reference to FIGS. 8 and 9. The processor 420 may control, according to the steps of FIG. 13, a camera selected according to user's selection or a setting of the electronic device 401.

At step 1305, the processor 420 may detect an external object using a plurality of beams generated using the plurality of antenna elements. The processor 420 may identify the external object (e.g., external object performing a gesture). In this case, the external object may be an object positioned outside the FOV of the camera 480. The processor 420 may perform beam sweeping by sequentially generating a plurality of narrow beams and by transmitting a signal and sensing a reflected signal for each of the narrow beams. Through the beam sweeping, the processor 420 may detect the direction of the external object. The processor 420 may detect the external object by identifying the direction and/or location of the external object which is moving. The electronic device 401 may identify the location of a gesture through beam sweeping, and may select a narrow beam corresponding to the location of the gesture.

At step 1310, the processor 420 may sense the movement of the external object using a first beam corresponding to the external object. According to step 1305, the processor 420 may select the first beam corresponding to the location of the gesture of the external object, and then the electronic device 401 may sense the movement of the external object using the selected beam. The processor 420 may sense the movement of the external object by sensing a phase change (e.g., a phase change of a reflected signal) based on the movement of the external object. The processor 420 may detect the movement of the external object using a plurality of beams (e.g., a plurality of beams including the first beam) corresponding to the location of the external object.

At step 1315, based on the movement of the external object, the processor 420 may identify the gesture corresponding to the movement. The processor 420 may identify the gesture based on the movement of the external object sensed using the wireless communication circuit. The processor 420 may identify the gesture of the external object using patterns corresponding to gestures stores in the memory 430.

At step 1320, the processor 420 may perform a camera function corresponding to the gesture. For example, the processor 420 may perform a different camera function according to the type of the gesture.

Figure 14:
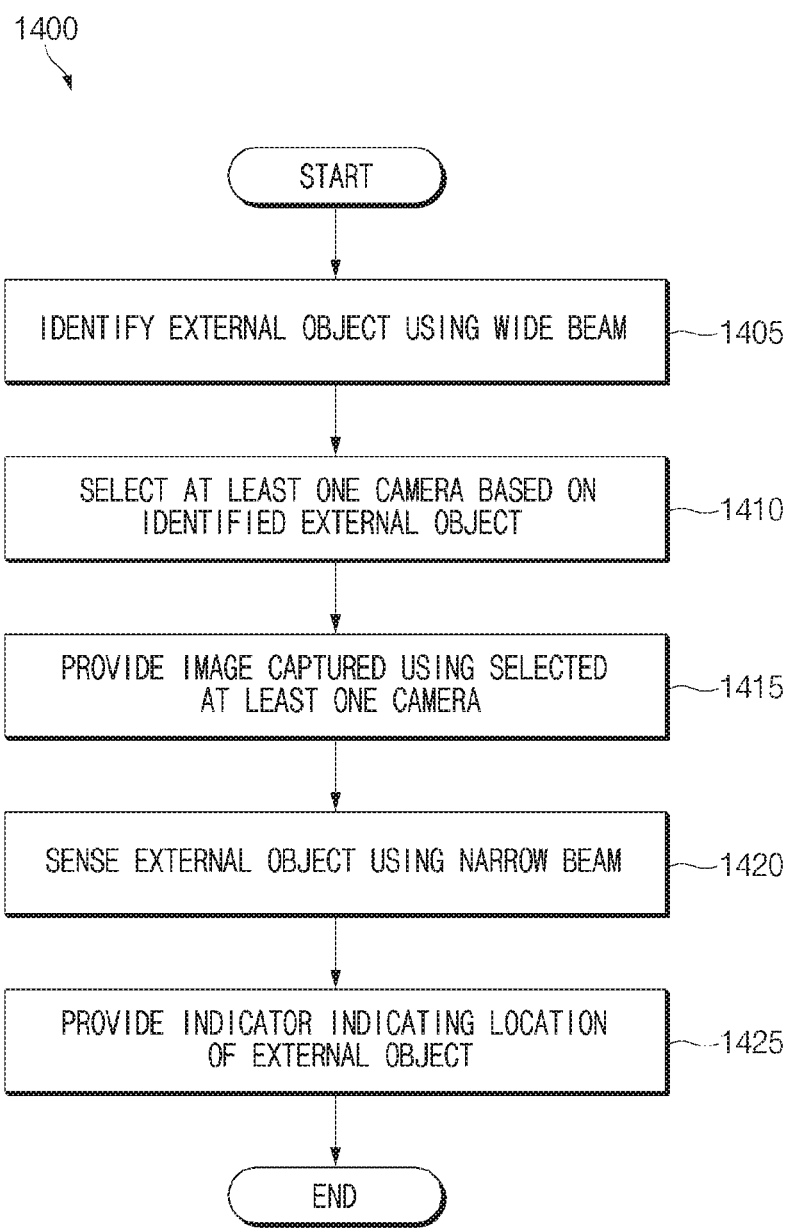
FIG. 14 is a flowchart of a user interface providing method, according to an embodiment.

FIG. 14 is a flowchart 1400 of a user interface providing method, according to an embodiment.

At step 1405, the processor 420 may identify an external object using a wide beam. The processor 420 may generate the wide beam using the communication circuit 490 and may identify the external object by sensing the movement of the external object using the wide beam.

At step 1410, the processor 420 may select at least one camera based on the identified external object. The processor 420 may select at least one camera corresponding to the direction of the identified external object. The processor 420 may select at least one camera based on the direction of and distance to the identified external object.

At step 1415, the processor 420 may provide a captured image using the selected at least one camera. The processor 420 may provide, on the display 460, a preview of the image captured using the camera.

Steps 1405 to 1415 may be performed before step 1305 of FIG. 13.

At step 1420, the processor 420 may sense the external object using a narrow beam. Step 1420 may correspond to step 1305 of FIG. 13.

At step 1425, the processor 420 may provide an indicator indicating the location of the external object. The processor 420 may use the indicator to display the location of the external object relative to the image displayed on the display 460.

A method for controlling a camera of an electronic device according to an embodiment may include generating a plurality of beams using an antenna array including a plurality of antenna elements and detecting an external object using the plurality of beams, sensing a movement of the external object using a first beam corresponding to the external object among the plurality of beams, identifying a gesture corresponding to the movement based on the movement of the external object and controlling a first camera of the electronic device based on the gesture.

The above method may further include generating a wide beam that is wider than the plurality of beams using a part of the plurality of antenna elements, sensing a location of the external object relative to the electronic device using the wide beam, and selecting the first camera from among the first camera and a second camera of the electronic device based on the location of the external object relative to the electronic device. The first camera and the second camera may be oriented in different directions.

The above method may further include displaying, on a display of the electronic device, an image captured using the selected first camera, and displaying, on the display, an indicator indicating the location of the external object detected using the plurality of beams.

The indicator may indicate relative location information about the location of the external object relative to the captured image. The external object sensed using the wide beam may be positioned outside an FOV of the first camera. The captured image may not include the external object.

Sensing the location of the external object relative to the electronic device using the wide beam may include determining whether the external object is positioned in front of or in a rear of the electronic device by sensing a phase change of the external object using the wide beam. The selecting of the first camera may include selecting the first camera according to a determined direction of the external object.

Detecting the external object using the plurality of beams may include sequentially generating the plurality of beams using the antenna array, and detecting the external object by transmitting a signal and sensing a reflected signal using the plurality of beams sequentially.

Sensing the movement of the external object using the first beam corresponding to the external object among the plurality of beams may include sensing a pattern of the phase change due to the movement of the external object using the first beam. Identifying the gesture corresponding to the movement based on the movement of the external object may include identifying the gesture corresponding to the movement of the external object at least partially based on the pattern of the phase change.

Identifying the gesture corresponding to the movement based on the movement of the external object may include selecting a gesture corresponding to the identified gesture from among a plurality of gestures stored in a memory of the electronic device.

An electronic device may identify an external object to be imaged using a communication circuit. An electronic device may select a camera corresponding to an external object, thus improving user convenience. An electronic device may provide a gesture recognition method that is more easy and improved.

Besides, various effects may be provided that are directly or indirectly identified through the present disclosure.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
a display;

a first camera;
a second camera;
a wireless communication circuit connected to an antenna array including a plurality of antenna elements and configured to perform beamforming via the antenna array;
a processor operatively connected to the display, the first camera, the second camera, and the wireless communication circuit; and
a memory operatively connected to the processor,
wherein the memory stores one or more instructions that, when executed, cause the processor to:
generate a wide beam using a part of the plurality of antenna elements;
detect, using the wide beam, an external object by sensing a phase change caused by movement of the external object;
select the first camera corresponding to a direction of the detected external object;
generate a plurality of narrow beams using the plurality of antenna elements and detecting the external object via a first beam among the plurality of narrow beams, each of the plurality of narrow beams having a coverage narrower than a coverage of the wide beam;
sense a movement of the external object via the first beam, the external object being located outside a field of view of the first camera;
identify a gesture corresponding to the movement of the external object; and
when the identified gesture corresponds to a capturing command, control the first camera to capture an image,
wherein the captured image does not include an image of the external object.

2. The electronic device of claim 1,
wherein the first camera and the second camera different directions relative to the electronic device.

3. The electronic device of claim 2, wherein the one or more instructions, when executed, further cause the processor to:
display, on the display, an image captured via the selected first camera; and
display, on the display, an indicator indicating a location of the external object which is located outside the field of view of the first camera.

4. The electronic device of claim 3, wherein the indicator indicates relative location information about the location of the external object relative to the image.

5. The electronic device of claim 1, wherein the one or more instructions, when executed, further cause the processor to:
sequentially generate the plurality of narrow beams via the antenna array; and
detect the external object by transmitting a signal and sensing a reflected signal using the plurality of narrow beams sequentially.

6. The electronic device of claim 1, wherein the one or more instructions, when executed, further cause the processor to:
sense a pattern of a phase change due to the movement of the external object via the first beam; and
identify the gesture corresponding to the movement of the external object at least partially based on the pattern of the phase change.

7. A method for controlling cameras of an electronic device, the method comprising:
generating a wide beam using a part of a plurality of antenna elements of the electronic device, the plurality of antenna elements consists an antenna array for beamforming;
detecting using the wide beam, an external object by sensing a phase change caused by movement of the external object;
selecting a first camera and a second camera of the electronic device, the first camera corresponding to a direction of the detected external object;
generating a plurality of narrow beams using the plurality of antenna elements and detecting the external object via a first beam among the plurality of narrow beams, each of the plurality of narrow beams having a coverage narrower than a coverage of the wide beam;
sensing a movement of the external object via the first beam, the external object being located outside a field of view of the wide beam;
identifying a gesture corresponding to the movement of the external object; and
when the identified gesture corresponds to a capturing command, controlling the first camera to capture an image,
wherein the captured image does not include an image of the external object.

8. The method of claim 7,
wherein the first camera and the second camera face different directions relative to the electronic device.

9. The method of claim 8, further comprising:
displaying, on a display of the electronic device, an image captured via the selected first camera; and
displaying, on the display, an indicator indicating a location of the external object which is located outside of the field of view of the first camera.

10. The method of claim 9, wherein the indicator indicates relative location information about the location of the external object relative to the displayed image.

11. The method of claim 7, wherein the generating the plurality of narrow beams comprises:
sequentially generating the plurality of narrow beams via the antenna array; and
detecting the external object by transmitting a signal and sensing a reflected signal using the plurality of narrow beams sequentially.

12. The method of claim 7,
wherein sensing the movement of the external object via the first beam comprises sensing a pattern of a phase change due to the movement of the external object via the first beam, and
wherein identifying the gesture corresponding to the movement based on the movement of the external object comprises identifying the gesture corresponding to the movement of the external object at least partially based on the pattern of the phase change.

* * * * *